(12) United States Patent
Hutchison et al.

(10) Patent No.: US 10,459,807 B2
(45) Date of Patent: Oct. 29, 2019

(54) DETERMINING MODIFIED PORTIONS OF A RAID STORAGE ARRAY

(71) Applicant: International Business Machines Corporation, Armonk, NY (US)

(72) Inventors: Gordon D. Hutchison, Eastleigh (GB); Miles Mulholland, Chandlers Ford (GB); Lee J. Sanders, Chichester (GB); Ben Sasson, North Baddesley (GB)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 15/602,924

(22) Filed: May 23, 2017

(65) Prior Publication Data

US 2018/0341561 A1    Nov. 29, 2018

(51) Int. Cl.
*G06F 11/00* (2006.01)
*G06F 11/16* (2006.01)
*G06F 11/10* (2006.01)

(52) U.S. Cl.
CPC ...... *G06F 11/1662* (2013.01); *G06F 11/1092* (2013.01); *G06F 2201/805* (2013.01); *G06F 2201/82* (2013.01)

(58) Field of Classification Search
CPC ............. G06F 11/1662; G06F 11/1092; G06F 2201/805
See application file for complete search history.

(56) References Cited

U.S. PATENT DOCUMENTS

| | | | | |
|---|---|---|---|---|
| 5,258,984 A * | 11/1993 | Menon | ................. | G06F 11/1076 714/6.32 |
| 7,047,358 B2 * | 5/2006 | Lee | ..................... | G06F 11/1076 707/999.202 |
| 7,055,058 B2 * | 5/2006 | Lee | ..................... | G06F 11/1084 711/114 |
| 7,386,662 B1 * | 6/2008 | Kekre | ................... | G06F 3/0605 711/113 |
| 7,478,221 B1 * | 1/2009 | Karr | ...................... | G06F 3/0605 711/203 |
| 7,636,801 B1 * | 12/2009 | Kekre | ................. | H04L 67/1097 709/218 |
| 7,739,544 B2 * | 6/2010 | Yamato | ............... | G06F 11/1092 714/6.32 |
| 8,412,979 B2 | 4/2013 | Flynn et al. | | |

(Continued)

OTHER PUBLICATIONS

Vectored I/O, Wikipedia (Year: 2013).*

(Continued)

*Primary Examiner* — Marc Duncan
*Assistant Examiner* — Jonathan D Gibson
(74) *Attorney, Agent, or Firm* — Nelson and Nelson; Daniel P. Nelson; Alexis V. Nelson (57) ABSTRACT

A computer-implemented method of determining modified portions of a RAID storage array for use in resynchronizing said RAID storage array after a failure, the computer-implemented method comprising: resolving areas in the RAID storage array that represent space allocated to volumes; resolving which of said allocated volumes comprise gathered writes; and for said allocated volumes that comprise gathered writes, resolving a set of writes that potentially have incomplete parity updates at the time of the failure.

17 Claims, 5 Drawing Sheets

(56) References Cited

U.S. PATENT DOCUMENTS

| | | | |
|---|---|---|---|
| 9,003,103 B2* | 4/2015 | Paleologu | G06F 11/1076 711/103 |
| 9,389,958 B2 | 7/2016 | Sundaram et al. | |
| 9,959,062 B1* | 5/2018 | Piszczek | G06F 3/0619 |
| 9,971,524 B1* | 5/2018 | Bruce | G06F 3/0617 |
| 10,055,150 B1* | 8/2018 | Fenol | G06F 12/0804 |
| 2003/0120863 A1* | 6/2003 | Lee | G06F 11/1084 711/114 |
| 2003/0120864 A1* | 6/2003 | Lee | G06F 11/1076 711/114 |
| 2003/0120869 A1* | 6/2003 | Lee | G06F 11/1084 711/135 |
| 2003/0182349 A1* | 9/2003 | Leong | G06F 3/061 718/100 |
| 2006/0117216 A1* | 6/2006 | Ikeuchi | G06F 11/0727 714/6.2 |
| 2008/0270878 A1* | 10/2008 | He | G06F 11/1076 714/805 |
| 2012/0226853 A1* | 9/2012 | Bert | G06F 3/0619 711/114 |
| 2014/0281689 A1 | 9/2014 | Fischer | |
| 2015/0269025 A1 | 9/2015 | Krishnamurthy et al. | |
| 2016/0217040 A1 | 7/2016 | Jin et al. | |
| 2016/0254826 A1* | 9/2016 | David | H04L 1/0043 714/758 |
| 2016/0283337 A1 | 9/2016 | Storer | |
| 2016/0357649 A1* | 12/2016 | Karrotu | G06F 11/2094 |
| 2018/0129448 A1* | 5/2018 | Duzly | G06F 3/0604 |

OTHER PUBLICATIONS

EMC, "XtremeIO Data Protection (XDP)," White Paper, Apr. 2015, available at: https://www.emc.com/collateral/white-paper/h13036-wp-xtremio-data-protection.pdf.

* cited by examiner

| 120 METADATA JOURNAL | | |
|---|---|---|
| VIRTUAL ADDRESS | SERIAL | PHYSICAL LOCATION |
| VIRTUAL ADDRESS | SERIAL | PHYSICAL LOCATION |
| VIRTUAL ADDRESS | SERIAL | PHYSICAL LOCATION |

DETERMINING MODIFIED PORTIONS OF A RAID STORAGE ARRAY

BACKGROUND

The present invention relates to determining modified portions of a RAID storage array, and more particularly to determining modified portions of a RAID storage array for use in resynchronizing the RAID storage array after a failure.

RAID storage arrays operate using parity to enable detection and possible correction of errors in data stored in the RAID storage array. There is an overhead of extra input/output (I/O) to read and write the parity in addition to reading and writing the data with which the parity is associated. Prior art RAID storage arrays reduce this overhead using "atomic parity update" in which an I/O is returned as complete before the I/O to the disk in the RAID storage array storing parity for that I/O is complete, or even issued. A record needs to be kept of parity updates that are "owing" or not completed. Typically this is in a metadata journal.

Prior art parity coalescing allows multiple, often sequentially addressed, updates to data stored within a single stride in the RAID storage array to have the effect on parity of each of the multiple updates combined and applied in one write. Again, a record needs to be kept of parity updates that are "owing" or not completed. Again, typically this is in a metadata journal.

When a drive is first plugged into a prior art RAID system, it typically has random bits stored until an initial matching data and parity pattern has been written to the drive. Until this initialization has been done, a record needs to be kept of locations on drives that do not yet have parity initialized because parity based RAID recovery techniques cannot be used for these locations.

When a prior art drive holding parity is determined by the RAID storage array as being "sick" or "slow", it may temporarily be given a "rest" from I/O and treated similar to that of a failed drive by the sending of test I/Os, "test unit ready" SCSI commands and allowing it to perform a reset. During this "rest" period, the drive is known as a "component-in-doubt". Reads of data may be handled using parity assisted "preemptive reconstruct" and writes may be handled by writing to all of the other stripes in the stride and "recovering" the omitted strip when the drive is no longer a "component-in-doubt". Until this recovery is complete, the RAID storage array must maintain metadata (typically in a metadata journal) in a bitmap for all of the I/Os that need this "component-in-doubt" recovery operation. For a gathered write volume, the time that writes are initiated may be tracked and thus writes made during the "component-in-doubt" period may be determined.

In the situations described above, the data and associated parity in a RAID storage array do not correspond. The record of locations that have parity updates not completed or not initialized allows the parity to be subsequently updated using the associated data. If there is a drive failure, in a normal "parity rebuild" operation, the RAID storage array reads the parity and data stored on the remaining drives and calculates what the data stored on the failed. However, this can take a long time for large RAID storage arrays as the data and parity on each drive in the RAID storage array must be read and written. Further, this "parity rebuild" operation is likely to be carried out at a critical time when a failed system has come back online and is likely to have a backlog of other tasks to perform. This means that any savings that can be made in the "parity rebuild" operation are valuable.

SUMMARY

According to an embodiment of the invention, a computer-implemented method of determining modified portions of a RAID storage array for use in resynchronizing said RAID storage array after a failure comprises: resolving areas in the RAID storage array that represent space allocated to volumes; resolving which of the allocated volumes comprise gathered writes; and for the allocated volumes that comprise gathered writes, resolving the set of writes that could have incomplete parity updates at the time of the failure.

Embodiments of the invention provide a system for determining modified portions of a RAID storage array having at least one volume for use in resynchronizing the RAID storage array after a failure, the system comprising: an allocation table comprising information identifying areas in the RAID storage array that represents space allocated to volumes; a metadata journal comprising information identifying which of the allocated volumes comprise gathered writes; and means for resolving the set of writes that could have incomplete parity updates at the time of the failure for the allocated volumes that comprise gathered writes.

Embodiments of the invention also provide a computer program product for determining modified portions of a RAID storage array for use in resynchronizing the RAID storage array after a failure, the computer program product comprising: a computer readable storage medium having program instructions embodied therewith, the program instructions executable by a computer to cause the computer to: resolve areas in the RAID storage array that represent space allocated to volumes; resolve which of the allocated volumes comprise gathered writes; and for the allocated volumes that comprise gathered writes, resolve the set of writes that could have incomplete parity updates at the time of the failure.

BRIEF DESCRIPTION OF THE DRAWINGS

Preferred embodiments of the present invention will now be described in more detail, by way of example only, with reference to the accompanying drawings, in which.

DETAILED DESCRIPTION

In a drive that has gathered writes, that is writes to a drive in which a single procedure call sequentially reads (or gathers) data from multiple buffers and writes it as a single data stream to the drive, it is possible to determine areas of the RAID storage array that contain volumes with gathered writes. Each of these areas has a set of recent data writes which will have parity that has not yet caught up with the associated data write. Information identifying these writes is stored in the records mentioned earlier of parity updates that are "owing" or not completed or of locations that do not yet have parity initialized. These records are stored in a metadata journal, which is stored on disk, but is designed so as to survive node replacement or a domain being determined to be dead. This information may be used to reduce the parity catchup that is necessary during parity rebuild. In an embodiment, the parity catchup may even be reduced to a background process.

A thin-provisioned volume is a volume used when the space to be presented to a host is larger than the space representing the disk on the storage. Data sparsity is achieved by the creation of a forward lookup structure that maps the "virtual domain" (the space the host thinks it has) to the physical domain. When a write is performed, space is allocated in the physical domain for the write, an entry is added into the forward lookup structure and then control is returned to the user. When the user wishes to read a virtual address, the user looks up the forward lookup structure and reads from the physical domain address specified.

Gathered write systems are a special form of thin-provisioned disk, making use of an allocator for writes to the physical domain. The allocator attempts to gather potentially non-contiguous writes together. In this way, writes from potentially many user volumes are written in close-to a sequential stream, which itself is a very friendly disk workload.

A journal is required to write in most thin-provisioned disk systems. When using a thin provisioned storage system, there is a risk that the forward lookup structure, which is typically stored on disk, gets corrupted. In this case, access to all of the data is lost. The disk used for forward lookup is likely to be subject to a significant I/O workload, so its entirely likely that a failure of some sort will occur at some time. In order to mitigate this, there is typically one or more backup copies of the metadata journal structure.

In a RAID storage system where both the backup copy of the forward lookup, and the forward lookup were to be written prior to the completion of a write, the performance would likely be inferior. A metadata journal logs a stream of modifications to the forward lookup structure. The backup copy of the forward lookup can be updated to the live copy using the metadata journal. Writing the metadata journal is generally just a sequential stream of entries whereas the forward lookup is a more complex structure like a B-tree, requiring more I/Os to update.

The metadata journal typically comprises (i) the virtual address written; (ii) the virtual disk associated with this write; and (iii) the physical address location associated with this write. It may further comprise (iv) invalidations associated with this I/O, for example, is this overwriting a prior physical address; and (v) in deduplicating storage systems, additional log events may be present for deduplication transactions.

The metadata journal is discarded once the backup copy is updated to the latest level. Embodiments of the present invention make use of this metadata journal to improve rebuild behavior prior to the metadata journal being discarded.

Gathered write systems work particularly well with this logging approach, as one is generally sequentially allocating along the disk. If all writes to a RAID storage array are gathered writes, one can trivially determine from the metadata journal what areas may have parity rebuild requirements.

Invalidations result in garbage collection on these systems. This in turn results in having to hop-back and reuse space from earlier in the disk. However, this is typically only once large amounts of storage are freed and there is a significant sequential allocation from the physical domain.

Figure 1:
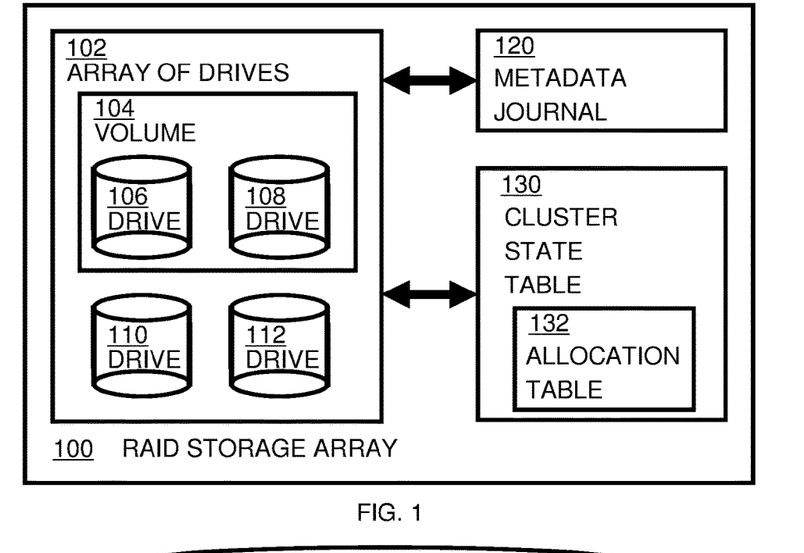
FIG. 1 shows a RAID storage array in which embodiments of the present invention may be implemented.

FIG. 1 shows a RAID storage array 100 suitable for use with embodiments of the present invention. RAID storage array 100 comprises an array of drives 102, a metadata journal 120 and a cluster state table 130. RAID storage array 100 also contains other elements, which will be familiar to persons skilled in the art, but which are not relevant for the purposes of this invention. Array of drives 102 is simply an array of drives 106-112. One or more portions of one or more of the drives 106, 108 may be allocated to a volume 104 and any number, including zero, portions of the drives 110, 112 may be not allocated to a volume. Metadata journal 120, briefly described earlier, comprises records of metadata and will be described in more detail with reference to FIG. 3. Cluster state table 130 comprises an allocation table 132 that shows which portions of the array of drives 102 are allocated to volumes 104.

Figure 2:
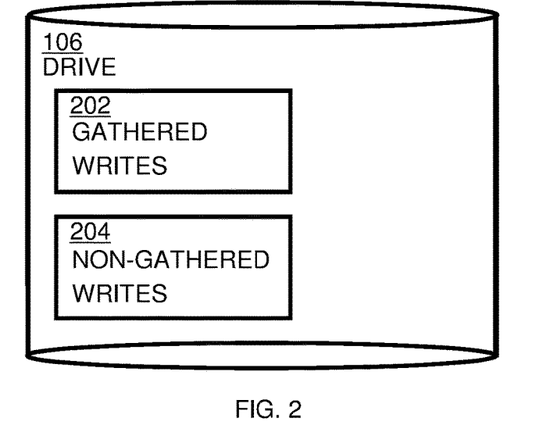
FIG. 2 shows an allocated drive of FIG. 1, the allocated drive comprises gathered writes and non-gathered writes.

FIG. 2 shows an allocated drive 106 of FIG. 1, the allocated drive 106 comprising gathered writes 202 and non-gathered writes 204. As briefly described earlier, a gathered write 202 is a write operation to a drive 106, 108 in which a single procedure call sequentially reads (or gathers) data from multiple buffers and writes it as a single data stream to the drive 106, 108. This has the advantage of atomicity, that is, a process can write into a set of buffers to a file without risk that another thread or process might perform I/O on the same file between the first process' writes, thereby corrupting the file or compromising the integrity of the input. It further has the advantage that an application that wants to write non-sequentially placed data in memory can do so in one I/O operation. For example, a fixed-size header and its associated payload data that are placed non-sequentially in memory can be written by a single I/O operation without first concatenating the header and the payload data to another buffer. A non-gathered write 204 is simply a write that is not a gathered write 202.

Gathered writes 202 generally describe a form of thin-provisioning in which storage is allocated sequentially. Typically, this is optimized in allocations of groups of writes which are associated with a single volume 104 to result in an improved read-cache behavior. A compressed gathered write 202 may be easily created by compressing buffers associated with writes to a physical domain and then only allocate sufficient space for the resultant output buffer.

Figure 3:
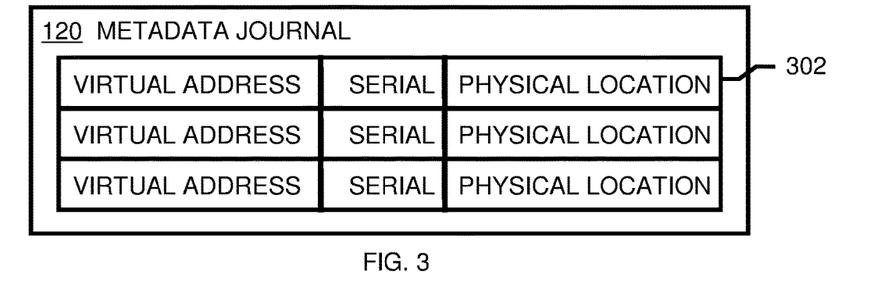
FIG. 3 shows the metadata journal of FIG. 1, together with example records of data that may be stored in the metadata journal.

FIG. 3 shows the metadata journal 120 of FIG. 1, together with an example record 302 of data that may be stored in the metadata journal 120. The exemplary record 302 of data shown in FIG. 3 comprises a virtual address, a serial and a physical location. The virtual address is simply the virtual address that is used to address the data when it is desired to read or write the data. The serial is a unique identifier associated with a piece of data that was written to the virtual address and which typically comprises some indication of the time at which the write occurred and a monotonically increasing identifier. The indication of the time may be a time stamp directly comprising the date and time or it may be any other indication of date and time. The monotonically increasing identifier may be any identifier that allows the order in which two writes were made to be determined from the monotonically increasing identifier. The monotonically increasing identifier may even be a monotonically decreasing identifier, so long as the identifier reaching zero is handled appropriately. The physical location is simply the physical location on the drive 106, 108 where the written data may be found. The prior art metadata journal 120 and the records 302 may be found in any typical RAID storage array 100. The prior art metadata journal 120 is used in the present invention, but not for the purpose for which it is provided in a prior art RAID storage array 100.

Figure 4:
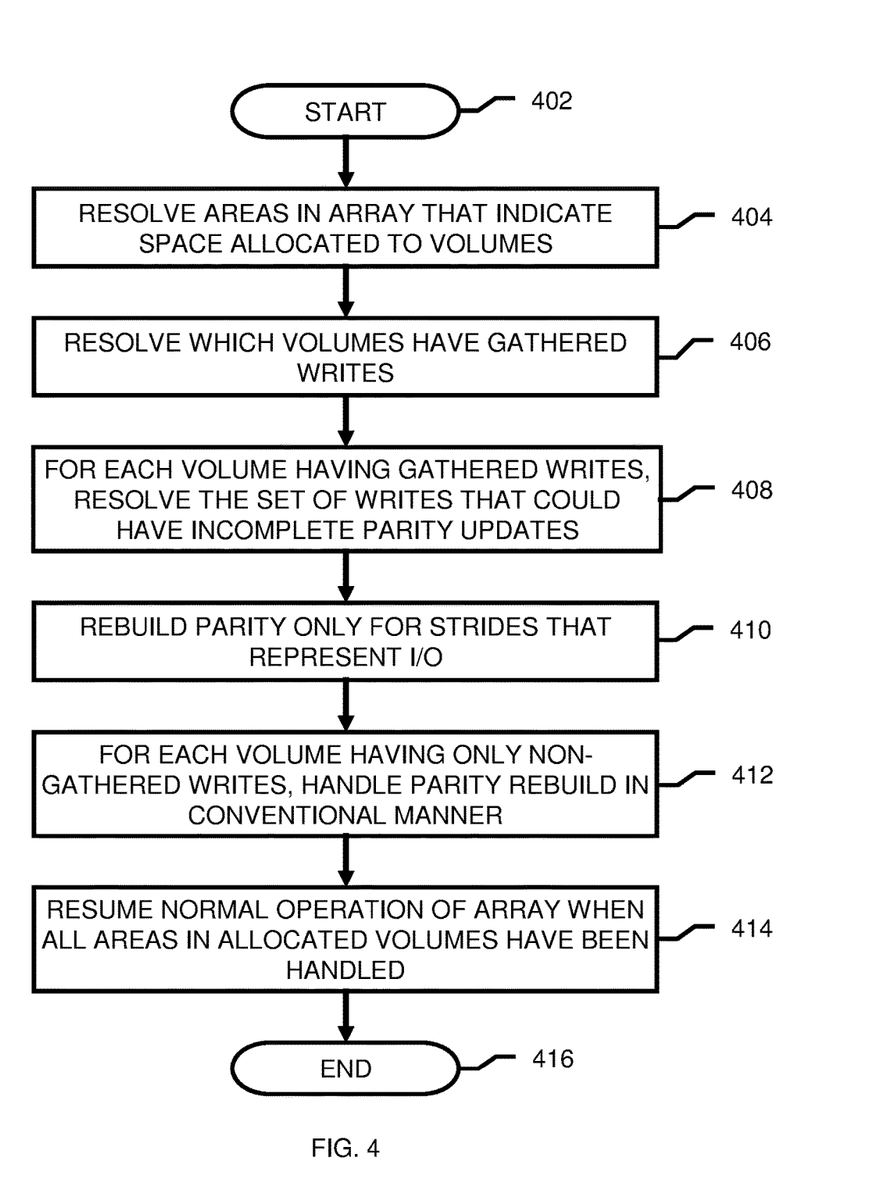
FIG. 4 shows a flow chart of a computer-implemented method of determining modified portions of the RAID storage array of FIG. 1 for use in resynchronizing the RAID storage array after a failure according to an embodiment of the present invention.

FIG. 4 shows a flow chart of a computer-implemented method of determining modified portions of a RAID storage array 100 for use in resynchronizing the RAID storage array 100 after a failure according to an embodiment of the present invention. The computer-implemented method starts at step 402. At step 404, the areas in the array of drives 102 that indicate space that is allocated to volumes 104 are resolved. The allocated areas are determined from the allocation table 132 in the cluster state table 130. Areas, such as drives 106, 108 in the array of drives 102 may be allocated to a volume 104 or areas may be unallocated, such as drives 110, 112 shown in FIG. 1. The information as to which areas are allocated to volumes may be stored, for example, in volatile memory, because this information can always be regenerated by simply referring again to the allocation table 132 in the cluster state table 130. Although, for clarity, FIG. 1 shows entire drives 106-112 as being allocated or unallocated, in practice, the areas that are allocated or unallocated are much smaller than an entire drive 106-112. The setting up and usage of the allocation table 132 will be familiar to persons skilled in the art as it forms part of most storage subsystems.

At step 406, the volumes 104 that have gathered writes 202 are resolved. This is also determined from the allocation table 132 in the cluster state table 130. Volumes that have gathered writes may be, for example, volumes that have been compressed and de-duplicated. Metadata journal 120 comprises information about the properties of the drive 106-112 and the pool of storage that the drive 106-112 uses. Any user I/O is tagged with the drive 106-112 ID in question. This drive 106-112 ID is used to look up the cluster details for that drive 106-112. When a drive 106-112 is initially created in the RAID storage array 100, the details are added to the cluster state table 130. When configuration level modifications to the drive 106-112 occur, then the details in the cluster state table 130 are updated. This information allows the I/O path to be directed. If the volume 104 is a thin-provisioned volume, then the cluster state table 130 identifies that a lookup into the metadata journal 120 is necessary before attempting to read from the drive 106-112. Similarly, for a compressed volume 104 write, the I/O path needs to know that the volume 104 is a compressed volume 104 and to send the data to be written to a compression engine for compression before making the compressed volume 104 write.

Data deduplication provides storage savings by eliminating redundant blocks of data. In data deduplication redundancy in the data is used to reduce the storage needed to store the data. An examples are where there are either multiple identical files (file redundancy) or multiple files that contain a portion of data that is identical to the content found in one or more other files (block redundancy). Examples of where such file redundancy may be found includes home directories and file sharing applications. Examples of where such block redundancy may be found include test & development datasets, virtual machines and virtual desktops. Such blocks may include operating system and application binaries that exist in these virtualized environments. Data deduplication is typically achieved by detecting that a buffer of data already exists in the RAID storage array 100 and instead of writing to the physical domain, a pointer is added at that piece of data's forward lookup structure, that is, for example, the B-tree node of the user volume containing the already existing piece of data. An update of the metadata journal 120 is more efficient then actually performing the write. Further, no space needs to be allocated in the physical domain to perform this write. Both of these result in deduplication savings.

Data compression provides savings by eliminating redundancy at the binary level within a block. Unlike data deduplication, data compression is not concerned with whether a second copy of the same block exists, it simply wants to store a block in the most efficient way. By storing data in a format that is denser than the native form, compression algorithms "deflate" and "inflate" data, respectively as the data is read or written. Examples of everyday common file level compression include MP3 audio and JPG image files. Examples of block deflating algorithms typically used in storage systems include DEFLATE/LZ77/LZ4.

At step 408, for each of the volumes 104 having gathered writes and which were resolved at step 406, the set of writes that could have incomplete parity updates is resolved. For each of volumes 104 not having gathered writes and which were resolved at step 406, parity is rebuilt, at step 412, in the conventional manner.

Figure 5:
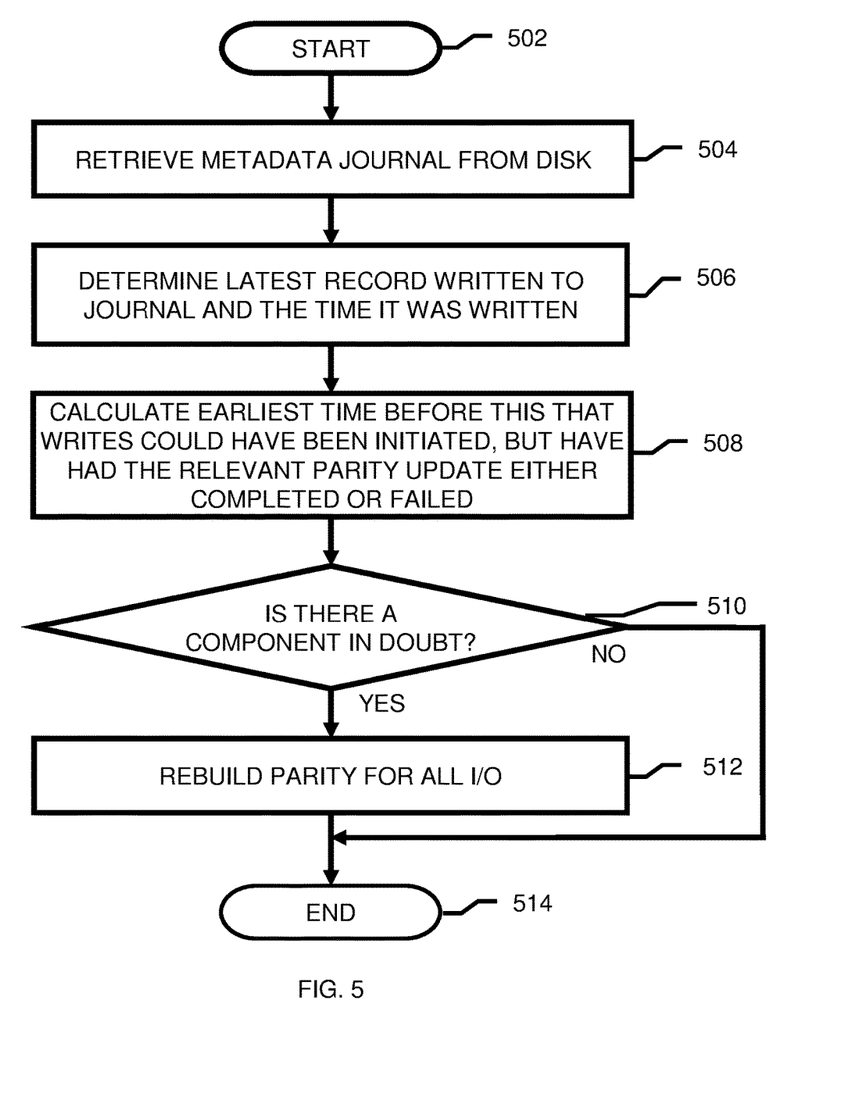
FIG. 5 shows a flow chart of the step in FIG. 4 of resolving the set of writes that could have incomplete parity updates at the time of the failure according to an embodiment of the present invention.

Referring now to FIG. 5, which will be used to describe step 408 in detail and which shows a flow chart of the step 406 in FIG. 4 of resolving the set of writes that could have incomplete parity updates at the time of the failure according to an embodiment of the present invention.

The computer-implemented method starts at step 502. At step 504, the metadata journal 120 is retrieved from RAID storage array 100. At step 506, the latest record 302 written to the metadata journal 120 is determined as is the time that the record 302 was written to the metadata journal 120. At step 508, the earliest time before the time determined at step 506 is calculated that writes could have been initiated, but have had the relevant parity update either not completed or failed.

Figure 6:
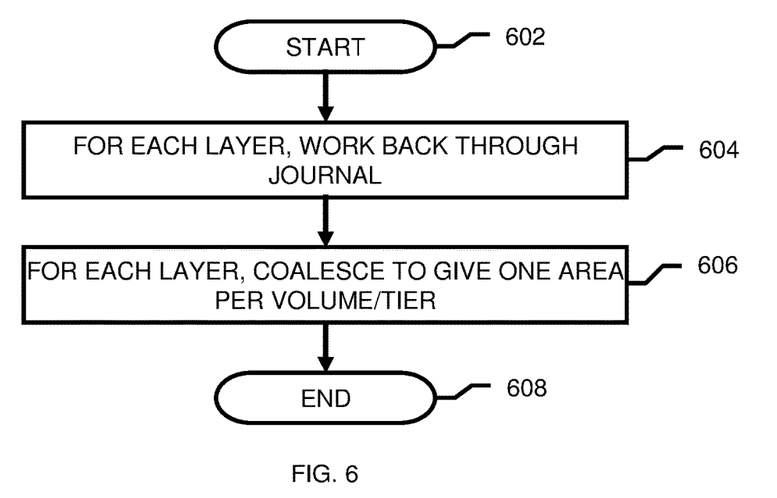
FIG. 6 shows a flow chart of the step in FIG. 5 of calculating the earliest time that writes could have been initiated, but which have had the associated parity update either completed or failed.

Referring now to FIG. 6 which shows step 508 of FIG. 5 of calculating the earliest time that writes could have been initiated, but which have had the associated parity update either completed or failed. The period between this time and the time of the failure is known as a "parity in doubt rebuild" window. The computer-implemented method starts at step 602. At step 604, for each of the layers in the software stack of the RAID storage array, writes are either complete or have failed using time-to-failure (TTF) within a set period of time, for example, 2 minutes. If the writes are complete, then the metadata journal 120 is empty. Additionally, RAID storage arrays can be set to issue parity coalescing and atomic parity updates to all parity disks within a set period of time that I/O is sent to the data strips. These writes to parity disks also in turn have a TTF that will limit the amount of time that the I/O is outstanding without being failed. A drive's "component-in-doubt" (CID) state is also not altered for individual I/Os and may be recorded persistently in the cluster state table 130 that survives a dead domain without impacting I/O performance. This means that it is possible to resolve, for each volume 104, an earliest possible time that writes could have been issued but for which parity updates have not been made. In an embodiment, for any caching that is in place below a gathered write 202 volume 104 that is operating without parity, as a repeat of the write operation from the host will not write to the same location in a drive 106, 108 and host reads can be handled by the 'upper cache' above the gathered write 202 component, writes to this cache have a time limit of delay before they are staged out to disk. In an embodiment, this may be zero for a write through cache.

At step 606, the computer-implemented method works back through the metadata journal 120 finding all writes that fit into this "parity in doubt rebuild" window. Each volume is likely to have one or more sequential writes, for each storage tier, within this "parity in doubt rebuild" window and these writes are likely to be contiguous per volume and tier and so can be coalesced to give one area of disk per volume and tier that needs to have parity checked and/or rebuilt. These areas are termed the "parity rebuild required" areas. The computer-implemented method ends at step 608.

Returning now to step 510 of FIG. 5, a check is made to see if there is a "component-in-doubt" in the RAID storage array. If there is no "component-in-doubt", then the computer-implemented method ends at step 514. If there is a "component-in-doubt", then the computer-implemented method continues at step 512, where the parity is rebuilt for all I/O that could have occurred since the component went into a 'component-in-doubt' state and was omitted from stride writes. The time period for which parity must be rebuilt still does not have to match "all time" and thus cover I/Os to the whole expanse of the volume for volumes with gathered writes. If the write front of the gather write journal can be tracked back to the time when "component-in-doubt" started then a technique going back over a longer time period for the drive that was "in-doubt" may be used. "Component-in-doubt" time is usually limited by the size of the metadata bitmap used to track it. In an embodiment, an alternative data structure to the currently used "component-in-doubt" bitmap may be used in order to reduce or remove the constraint that the size of the bitmap constrains the length of time that "component-in-doubt" may be in operation. Although an unlimited "component-in-doubt" period may not be desirable, the fact that gathered writes may be linked to the time issued and to the fact that the computer-implemented method of the present invention operates indefinitely, allows the length of time the "component-in-doubt" feature can be operated to be improved. The computer-implemented method ends at step 514.

Returning now to step 410 of FIG. 4, for each of the volumes 104 having gathered writes and which were resolved at step 406, parity is rebuilt only for those strides that represent I/O in a period before a failure because these gathered writes can be the only "in-flight" writes at the time of the failure.

At step 414, when all areas in the allocated volumes have been handled, the normal operation of the array of drives 102 may be resumed. The computer-implemented method ends at step 416.

Figure 7:
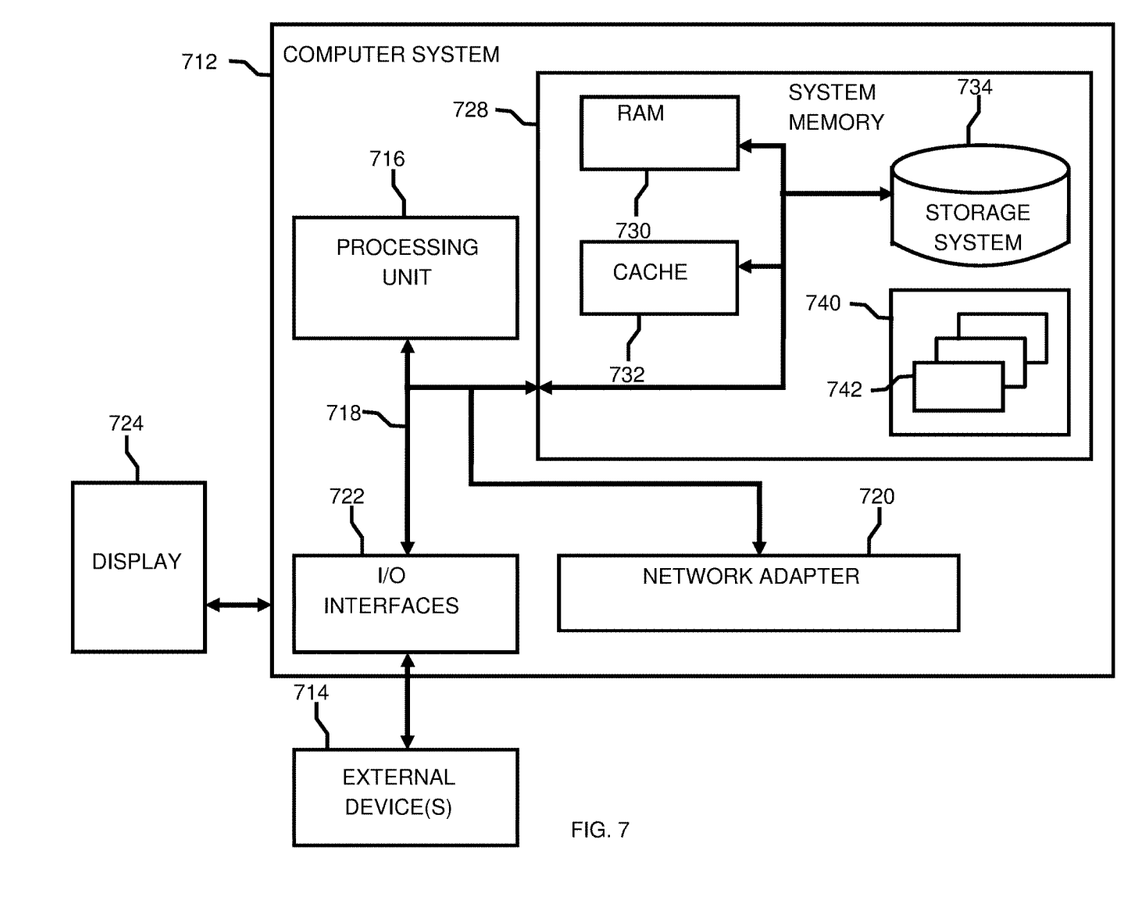
FIG. 7 is a block diagram of a computer system in which embodiments of the present invention may be utilized.

Referring now to FIG. 7, a schematic of an example of computing system is shown. Computing system 712 is only one example of a suitable computing system and is not intended to suggest any limitation as to the scope of use or functionality of embodiments of the invention described herein. Regardless, computing system 712 is capable of being implemented and/or performing any of the functionality set forth hereinabove.

Computer system/server 712 is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method of determining modified portions of a RAID storage array for use in resynchronizing said RAID storage array after a failure, the computer-implemented method comprising:
resolving areas in the RAID storage array that represent space allocated to volumes;
resolving which of said allocated volumes comprise gathered writes, wherein the gathered writes are writes to a drive of the RAID storage array in which a single procedure call sequentially gathers data from multiple buffers and writes it as a single data stream to the drive;
for said allocated volumes that comprise gathered writes, resolving a set of writes that potentially have incomplete parity updates at the time of a failure of a drive in the RAID storage array; and
for each of said allocated volumes resolved as having gathered writes, rebuilding parity only for strides that represent I/O in a period before the failure.

2. The computer-implemented method of claim 1, wherein said resolving the set of writes that potentially have incomplete parity updates at the time of the failure comprises examining a metadata journal to determine writes for which parity has not been successfully written.

3. The computer-implemented method of claim 2, wherein said resolving the set of writes that potentially have incomplete parity updates at the time of the failure comprises:
determining, for each volume, an earliest possible time that writes potentially have been issued but for which parity updates have not been made;
determining, from said metadata journal, one or more writes that potentially have incomplete parity updates at the time of the failure; and
coalescing said one or more writes to determine one area of disk per volume and tier that needs to have parity at least one of checked and rebuilt.

4. The computer-implemented method of claim 2, further comprising:
determining whether there is a "component-in-doubt" in said RAID storage array; and
responsive to a determination that there is a "component-in-doubt" associated with a component in said RAID storage array, rebuilding parity for all I/O that potentially have occurred since said component went into a "component-in-doubt" state.

5. The computer-implemented method of claim 1, wherein said resolving which of said allocated volumes comprise gathered writes comprises examining a metadata journal to determine which writes are gathered writes.

6. The computer-implemented method of claim 1, wherein said resolving areas in the RAID storage array that represent space allocated to volumes comprises accessing an allocation table.

7. The computer-implemented method of claim 1, further comprising, for each of said allocated volumes resolved as not having gathered writes, rebuilding parity in a conventional manner.

8. A system for determining modified portions of a RAID storage array having at least one volume for use in resynchronizing said RAID storage array after a failure, the system comprising:
an allocation table comprising information identifying areas in said RAID storage array that represents space allocated to volumes;
a metadata journal comprising information identifying which of said allocated volumes comprise gathered writes, wherein the gathered writes are writes to a drive of the RAID storage array in which a single procedure call sequentially gathers data from multiple buffers and writes it as a single data stream to the drive;
means for resolving, for said allocated volumes that comprise gathered writes, a set of writes that potentially have incomplete parity updates at the time of a failure of a drive in the RAID storage array; and
for each of said allocated volumes resolved as having gathered writes, means for rebuilding parity only for strides that represent I/O in a period before the failure.

9. The system of claim 8, wherein said means for resolving the set of writes that potentially have incomplete parity updates at the time of the failure comprises means for examining a metadata journal to determine writes for which parity has not been successfully written.

10. The system of claim 8, wherein said metadata journal comprises indications as to which writes are gathered writes.

11. A computer program product for determining modified portions of a RAID storage array for use in resynchronizing said RAID storage array after a failure, the computer program product comprising a non-transitory computer-readable storage medium having program instructions embodied therewith, the program instructions executable by a computer to cause the computer to:
resolve areas in the RAID storage array that represent space allocated to volumes;

resolve which of said allocated volumes comprise gathered writes, wherein the gathered writes are writes to a drive of the RAID storage array in which a single procedure call sequentially gathers data from multiple buffers and writes it as a single data stream to the drive;

for said allocated volumes that comprise gathered writes, resolve a set of writes that potentially have incomplete parity updates at the time of a failure of a drive in the RAID storage array; and for each of said allocated volumes resolved as having gathered writes, rebuild parity only for strides that represent I/O in a period before the failure.

12. The computer program product of claim 11, wherein said resolving the set of writes that potentially have incomplete parity updates at the time of the failure comprises examining a metadata journal to determine writes for which parity has not been successfully written.

13. The computer program product of claim 12, wherein said resolving the set of writes that potentially have incomplete parity updates at the time of the failure comprises:
  determining, for each volume, an earliest possible time that writes potentially have been issued but for which parity updates have not been made;
  determining, from said metadata journal, one or more writes that potentially have incomplete parity updates at the time of the failure; and
  coalescing said one or more writes to determine one area of disk per volume and tier that needs to have parity at least one of checked and rebuilt.

14. The computer program product of claim 12, further comprising:
  determining whether there is a "component-in-doubt" in said RAID storage array; and
  responsive to a determination that there is a "component-in-doubt" associated with a component in said RAID storage array, rebuilding parity for all I/O that potentially have occurred since said component went into a "component-in-doubt" state.

15. The computer program product of claim 11, wherein said resolving which of said allocated volumes comprise gathered writes comprises examining a metadata journal to determine which writes are gathered writes.

16. The computer program product of claim 11, wherein said resolving areas in the RAID storage array that represent space allocated to volumes comprises accessing an allocation table.

17. The computer program product of claim 11, further comprising, for each of said allocated volumes resolved as not having gathered writes, rebuilding parity in a conventional manner.

* * * * *